(12) United States Patent
Je et al.

(10) Patent No.: US 11,002,571 B2
(45) Date of Patent: May 11, 2021

(54) METHOD OF FABRICATING NANOWIRE CONNECTED WITH OPTICAL FIBER USING A MICROPIPETTE

(71) Applicant: LESSENGERS INC., Gyeongsangbuk-do (KR)

(72) Inventors: Jung Ho Je, Gyeongsangbuk-do (KR); Nam Ho Kim, Ulsan (KR); Jun Ho Lee, Incheon (KR)

(73) Assignee: LESSENGERS INC., Gyeongsangbuk-do (KR)

( * ) Notice: Subject to any disclaimer, the term of this patent is extended or adjusted under 35 U.S.C. 154(b) by 92 days.

(21) Appl. No.: 16/496,924

(22) PCT Filed: Nov. 17, 2017

(86) PCT No.: PCT/KR2017/013082
§ 371 (c)(1),
(2) Date: Sep. 23, 2019

(87) PCT Pub. No.: WO2018/174368
PCT Pub. Date: Sep. 27, 2018

(65) Prior Publication Data
US 2020/0103256 A1  Apr. 2, 2020

(30) Foreign Application Priority Data
Mar. 24, 2017 (KR) .......................... 10-2017-0037708

(51) Int. Cl.
*B82Y 40/00* (2011.01)
*G01D 5/26* (2006.01)

(52) U.S. Cl.
CPC .................................. *G01D 5/268* (2013.01)

(58) Field of Classification Search
CPC .......... B82Y 40/00; G01D 5/268; B82B 3/00; B82B 3/0023; G02B 6/107; G02B 6/25
(Continued)

(56) References Cited

U.S. PATENT DOCUMENTS

2016/0049214 A1   2/2016   Reece
2018/0010266 A1 * 1/2018   Li ........................ D02G 3/367

FOREIGN PATENT DOCUMENTS

KR   10-2011-0086253   7/2011
KR   10-2013-0057546   6/2013
(Continued)

OTHER PUBLICATIONS

Junho Lee, et. "Quantitative Probing of Cu2+ Ions Naturally Present in Single Living Cells" www. MaterialsViews.com, (2016).

*Primary Examiner* — Que Tan Le
(74) *Attorney, Agent, or Firm* — Womble Bond Dickinson (US)

(57) ABSTRACT

The present invention relates to a method of fabricating a nanowire connected to an optical fiber, the method comprising the steps of: a) filling a micropipette with a material solution to form a nanowire; b) coaxially aligning the micropipette with the optical fiber at one end of the optical fiber such that a longitudinal axis of the optical fiber and a longitudinal axis of the micropipette are aligned in a line; c) forming a meniscus of the material solution to form the nanowire in the coaxially aligned state; and d) fabricating the nanowire by evaporating a solvent from the material solution to form the nanowire while lifting the micropipette in a state in which the meniscus is formed, in a direction away from the optical fiber. The method further comprises a step of a step of controlling a shape of the distal end of the nanowire by irradiating a laser to the nanowire fabricated.

10 Claims, 6 Drawing Sheets

(58) Field of Classification Search
USPC .................................. 250/227.11, 221, 559.3
See application file for complete search history.

(56) References Cited

FOREIGN PATENT DOCUMENTS

| KR | 10-1526324 | 6/2015 |
| KR | 10-2017-0024251 | 3/2017 |

* cited by examiner

METHOD OF FABRICATING NANOWIRE CONNECTED WITH OPTICAL FIBER USING A MICROPIPETTE

PRIORITY

The present application is a National Phase Application of and claims the benefit of International Application No. PCT/KR2017/013082, filed on Nov. 17, 2017 and entitled "Method of Fabricating Nanowire Connected with Optical Fiber", which claims the benefit of Korean Patent Application No. 10-2017-0037708 filed Mar. 24, 2017, both of which are incorporated by reference in their entirety.

TECHNICAL FIELD

The present invention relates to a method of fabricating a nanowire connected to an optical fiber. The present invention also relates to an optical sensor comprising nanowires produced by this method.

BACKGROUND ART

An optical fiber includes a central portion (a core) formed of material of a higher index of refraction and an outer portion (a clad) formed of material of a lower index of refraction, so that light passing through the central portion may be totally reflected. Accordingly, optical fibers are widely used for applications such as optical communications and optical sensors because they are very low in loss of light to be transmitted, thus being low in loss of data to be transmitted and are hardly subjected to external influences.

Further, optical fibers generally have a diameter of 100 to 1,000 μm due to the fabrication process and the function implementation. Among optical fibers having a small diameter, an optical fiber used as a standard one has a core diameter of 10 μm and a clad diameter of 125 μm. It is not easy to make the diameter of the optical fiber, especially the core, smaller than this because of the difficulty of the fabrication process. On the other hand, due to the need for nano-scale research, a variety of researches have been recently conducted in order that optical fibers may be used in nanoscale researches, experiments, devices, etc.

For example, a method of connecting a nanowire having a nano diameter to a distal end of an optical fiber has been studied. A large light loss may occur at the connection point between the nanowire and the optical fabler if the optical fiber and the nanowire are separately fabricated and then positioned in close proximity to connect the nanowire to the distal end of the optical fiber (Xin Guo et al., Nano Lett., 2009, 9(12), pp 4515-4519 "Direct Coupling of Plasmonics and Photonic Nanowires for Hybrid Nanophotonic Components and Circuits"). FIG. 1 is a diagram showing that when the optical fiber and the nanowire are separately fabricated and then connected, light scattering occurs at a connection portion thereof, and light loss is large. Specifically, it is shown that, when light transfer to a silver rod is observed after light is injected into one end of a ZnO rod, light is scattered at the connection portion of the two rods.

DETAILED DESCRIPTION OF THE INVENTION

Technical Problem

In order to solve the problem that light scattering occurs at the connection portion between the optical fiber and the nanowire which cannot be solved by the conventional technique, the object of the invention is to provide a method for minimizing a light loss in the connection portion between the optical fiber and the nanowire by directly growing a nanowire from a distal end of the optical fiber in alignment with an optical axis.

Further, the invention aims at controlling reception, transmission and reflection of light according to the control of a distal end portion of the nanowire.

Technical Solution

A method of fabricating a nanowire connected to an optical fiber according to the invention comprises:
a) filling a micropipette with a material solution to form a nanowire;
b) coaxially aligning the micropipette with the optical fiber at one end of the optical fiber such that a longitudinal axis of the optical fiber and a longitudinal axis of the micropipette are aligned in a line;
c) forming a meniscus of the material solution to form the nanowire in the coaxially aligned state; and
d) fabricating the nanowire by evaporating a solvent from the material solution to form the nanowire while lifting the micropipette in a state in which the meniscus is formed, in a direction away from the optical fiber.

Preferably, the nanowire according to the invention may further comprise a step of controlling the shape of the distal end of the nanowire by irradiating a laser to the nanowire.

Preferably, the optical fiber is of a tapered shape and has a diameter of 0.2 μm or less at its distal end.

Preferably, the diameter of the optical fiber end is smaller than that of the micropipette.

Preferably, the step of coaxially aligning the micropipette with the optical fiber at one end of the optical fiber such that the longitudinal axis of the optical fiber and the longitudinal axis of the micropipette are aligned in a straight line, is performed by using optical lenses positioned in the x- and y-axes.

Preferably, the nanowire connected to the optical fiber has a light-coupling efficiency of 84% or more.

In addition, the invention relates to an optical sensor including an optical fiber and a nanowire connected to the optical fiber fabricated in accordance with the invention.

Preferably, the optical sensor transmits light in a direction from the optical fiber to the nanowire.

Preferably, the optical sensor receives light in a direction from the nanowire to the optical fiber.

Preferably, the optical sensor transmits light in a direction from the optical fiber to the nanowire and receives light in an opposite direction to the direction.

Effect of the Invention

The nanowire connected to the optical fiber fabricated according to the invention has no or minimal light loss at the connection portion thereof with the optical fiber.

The nanowire connected to the optical fiber fabricated according to the invention may be optimized not only for transmission and reception of light from the optical fiber to the nanowire but also for transmission and reception of light from the nanowire to the optical fiber, by means of the control of the distal end portion of the nanowire.

DETAILED DESCRIPTION OF THE INVENTION

Figure 1:
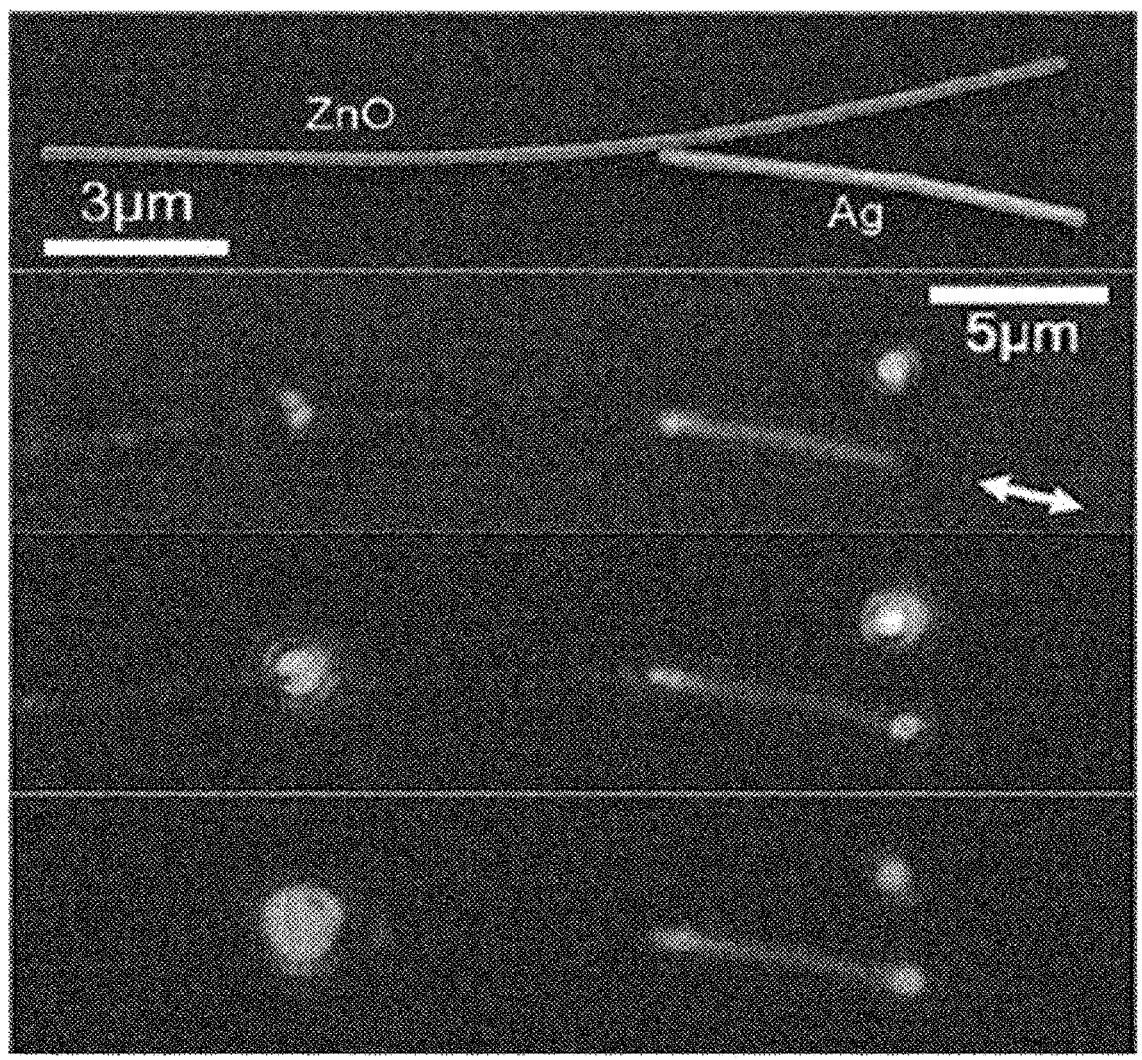
FIG. 1 is a diagram showing a light loss when an optical fiber and a nanowire are connected by a conventional method.

All technical terms used in the present invention have the following definitions and are consistent with meanings as generally understood by a person skilled in the art to which the invention pertains, unless otherwise defined. In addition, although preferred methods or samples are described in this specification, other similar or equivalent ones are also included in the scope of the invention.

The term "meniscus" used herein means a curved surface of a liquid in a container as a result of surface tension. Depending on the nature of liquid, the liquid surface is concave or convex.

The present invention relates to a method of fabricating a nanowire connected to an optical fiber, and more particularly, to a method of fabricating a nanowire connected to an optical fiber, the method comprising the steps:
a) filling a micropipette with a material solution to form a nanowire;
b) coaxially aligning the micropipette with the optical fiber at one end of the optical fiber such that a longitudinal axis of the optical fiber and a longitudinal axis of the micropipette are aligned in a line;
c) forming a meniscus of the material solution to form the nanowire in the coaxially aligned state; and
d) fabricating the nanowire by evaporating a solvent from the material solution to form the nanowire while lifting the micropipette in a state in which the meniscus is formed, in a direction away from the optical fiber. Hereinafter, each step will be described in a greater detail.

First, a step (a) of filling a micropipette with a material solution to form a nanowire will be described.

Material solution to form the nanowire contains all materials of being capable of forming a meniscus and most organic matters may be used as the material solution. Specifically, polystyrene, poly(methylmethacrylate) or polycarbonate may be used, and perfluorinated compounds (PFCs) such as CYTOP (amorphous fluoropolymer) may also be used. In addition, organic conductive polymers (i-conjugated polymers) may also be used, which have the features wherein electrical and optical properties thereof can be freely controlled by chemical doping. As the solvent of material solution for forming the nanowire, an easily evaporating material may be used. For example, at least one species selected from the group consisting of xylene, chlorobenzene, and toluene may be used.

The micropipette may be fabricated to a desired diameter using a pipette puller, or a commercially available micropipette may also be used. The diameter of the micropipette is preferably larger than that of the distal end of the optical fiber, and may be, for example, 0.2 μm or more. Therefore, light loss may be minimized by fabricating the nanowire in such a form that the nanowire wraps the optical fiber. That is, any micropipette may be used in the present invention without limitation in the type, the shape, etc. of the micropipette as long as it has the diameter larger than that of the distal end of the optical fiber and is capable of forming a meniscus.

Next, the micropipette is coaxially aligned with the optical fiber at one end of the optical fiber such that a longitudinal axis of the optical fiber and a longitudinal axis of the micropipette are aligned in a line (step b).

It is preferable that an optical fiber used in the present invention has a tapered shape, that is, a narrowing shape, at a portion in contact with the nanowire. Since the diameter of a generally-used core/clad optical fiber is 100 μm or more, it is preferable that one end of the optical fiber is tapered to have a diameter of 0.2 μm or less, preferably 0.1 μm or less, so as to efficiently contact the nanowire.

Figure 2:
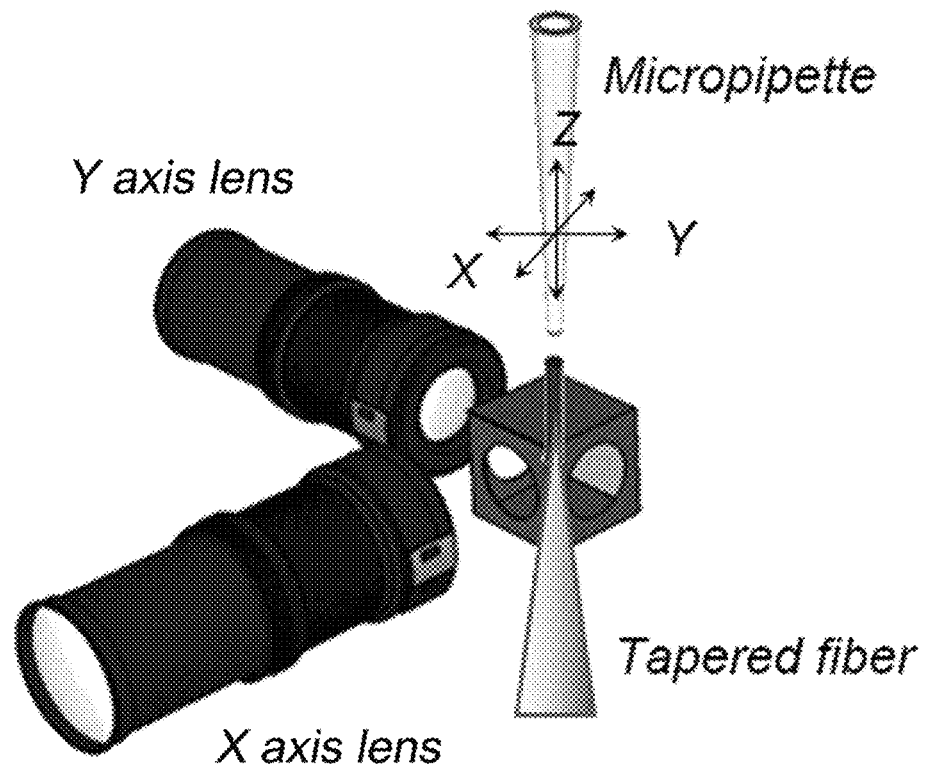
FIG. 2 is a view showing a coaxial alignment of a micropipette with an optical fiber at an end of an optical fiber according to the present invention.

FIG. 2 shows that the micropipette is coaxially aligned with the optical fiber at the tapered end thereof such that the longitudinal axis of the optical fiber and the longitudinal axis of the micropipette lie on a straight line. So as to coaxially align the longitudinal axis of the tapered optical fiber with the longitudinal axis of the micropipette, it is preferable to align them with each other on x-axis and y-axis using two optical lenses. In the case of using only one optical lens, it is difficult to align them in a coaxial line due to the error occurring in other direction, and the nanowire to be grown by means of a micropipette cannot be grown along the coaxial axis, resulting in a large optical transmission loss between the tapered optical fiber and the nanowire. For coaxial alignment, it is desirable to position the optical lenses on the x-axis and the y-axis perpendicularly to each other. A light loss may be minimized by coaxially aligning a micropipette with the end of the tapered optical fiber, causing a nanowire to grow along a coaxial line with the coaxial alignment of the micropipette.

Next, a step (c) of forming a meniscus of a material solution for forming a nanowire in the coaxial alignment state is performed. A micropipette filled with the material solution for forming the nanowire is spaced apart from one end of the optical fiber to form a meniscus of the material solution for forming the nanowire.

Next, step (d) for fabricating a nanowire is performed wherein the nanowire is fabricated by evaporating a solvent of the material solution for forming a nanowire while lifting the micropipette in a state of said meniscus being formed, in a direction away from the optical fiber (step d). Specifically, when the micropipette is lifted in a direction away from the optical fiber while maintaining a gap between the micropipette and a formed nanowire in such a distance therebetween to induce the meniscus of the material solution for forming the nanowire, a liquid within the nanowire being formed rapidly evaporates and thus a dissolved material solidifies to form a column. The micropipette is preferably lifted in the longitudinal axis of the optical fiber, i.e., in a direction (z-axis) perpendicular to the x-axis and the y-axis using the optical lenses. Here, the optical lenses are arranged in the x and y axes, respectively. A lifting speed (drawing speed) may be adjusted depending on the type and the concentration of the material solution to form the nanowire.

Furthermore, the producing method of the nanowire connected to the optical fiber according to the present invention may further include a step (e) of controlling a shape of an end portion of the nanowire by irradiating said produced nanowire with a laser. In this case, a nanowire connected to the optical fiber may be produced by steps of: a) filling a micropipette with a material solution to form a nanowire; b) coaxially aligning the micropipette with the optical fiber at one end of the optical fiber such that a longitudinal axis of the optical fiber and a longitudinal axis of the micropipette are aligned in a line; c) forming a meniscus of the material solution for forming the nanowire in the coaxially aligned state; d) fabricating the nanowire by evaporating a solvent from the material solution to form the nanowire while lifting the micropipette in a state in which the meniscus is formed, in a direction away from the optical fiber; and (e) controlling a shape of an end portion of the nanowire by irradiating a laser beam to said produced nanowire.

Figure 3:
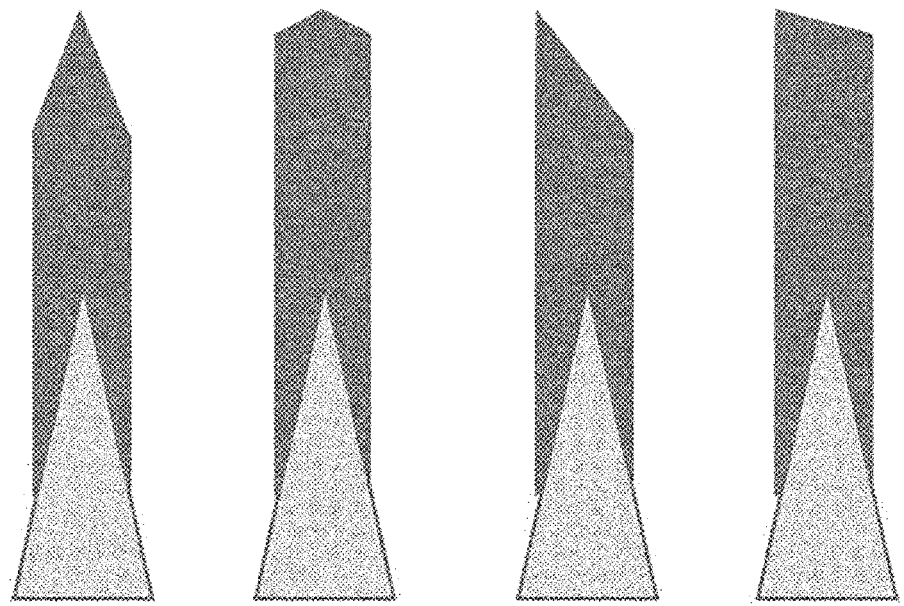
FIG. 3 is a schematic diagram showing examples of the shape of a distal end of a nanowire controlled by a laser according to the present invention.

The degree of reflection and transmission of light can be determined depending on the shape of the distal end portion of the nanowire. Therefore, it is preferable to control the shape of the distal end portion of the nanowire in order to improve reproducibility and reliability such as light reception and light detection. In particular, a shape control of a distal end portion of the nanowire is very important because it determines the intensity and the directivity of light received when light is received from the exterior through the distal end portion of the nanowire. FIG. 3 shows examples of the shape of a distal end portion of a nanowire controlled by a laser according to the present invention.

Figure 4:
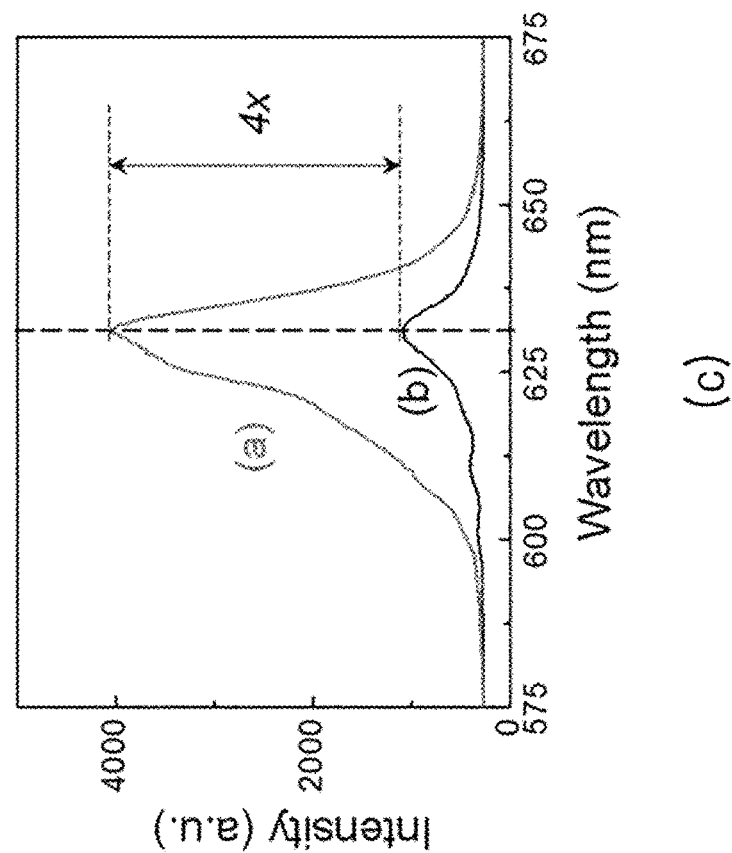
FIGS. 4a and 4b are photographs showing nanowires having the controlled shapes of the distal ends of the nanowires according to the present invention.
FIG. 4c shows a graph showing a light reception intensity of the nanowires of FIGS. 4a and 4b.
Figure 4:
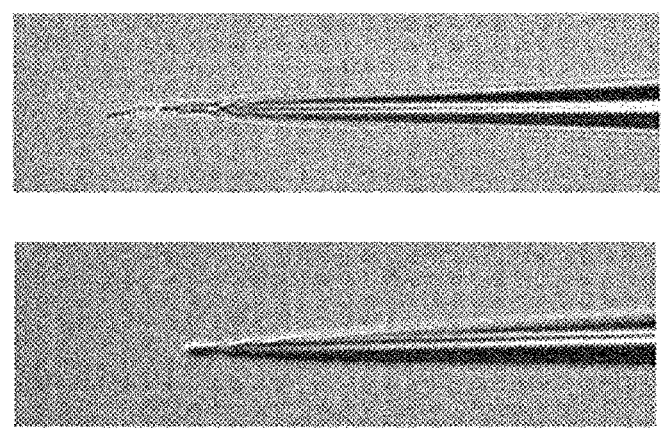

In addition, FIGS. 4a and 4b show nanowires having a distal end portions controlled in terms of a shape thereof, and FIG. 4c shows a graph for comparing a light reception between FIGS. 4a and 4b. A nanowire of FIG. 4b is characterized that it is fabricated to be sharper at the cut surface than a nanowire of FIG. 4a. On the other hand, when the same light is guided from the other end of the optical fiber which is opposite to the end of the optical fiber and which is not connected to the nanowire, the intensity of light reflected and returned is measured and shown in FIG. 4c. It can be observed that about one-fourths of light reflected and returned in the case of the nanowire of FIG. 4a is reflected and returned in the nanowire of FIG. 4b having a pointed end. It can be observed that light is transmitted outward through the end portion of the nanowire, as shown in FIG. 4b. That is, it is possible to determine reflection and transmission of light by controlling the shape of the distal end portion of the nanowire.

Figure 5:
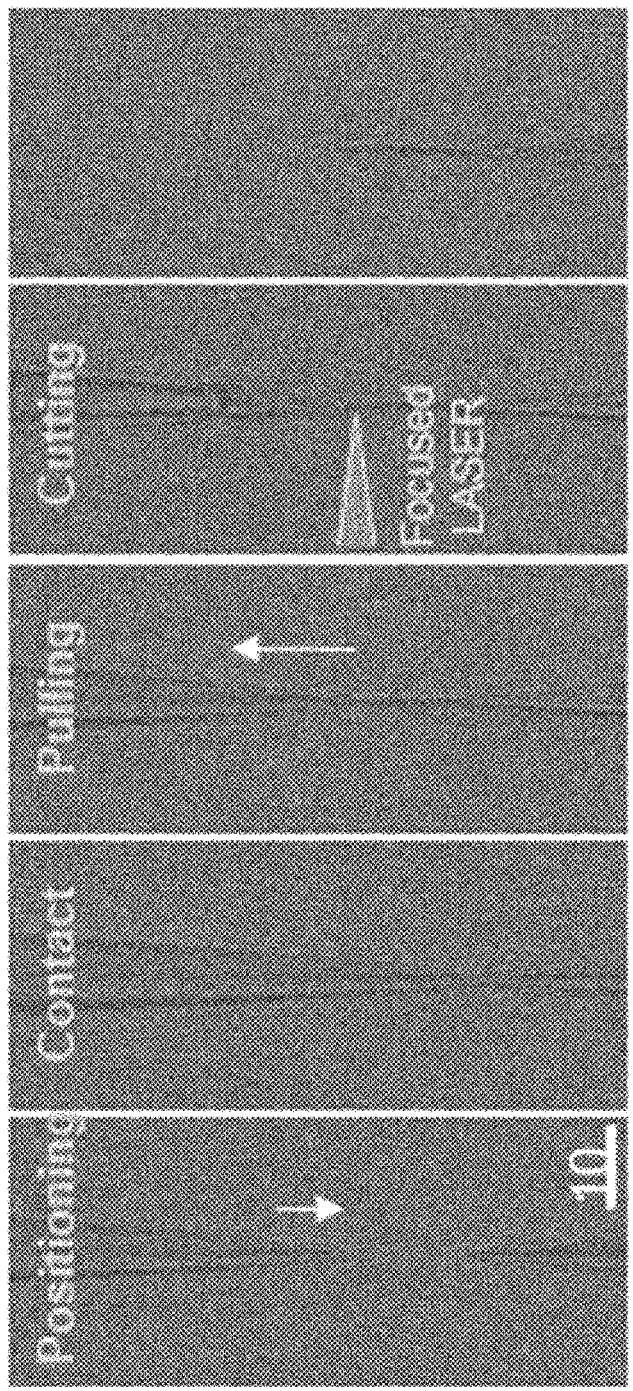
FIG. 5 is a view showing a fabricating process of the nanowire.

FIG. 5 is a view showing the entire fabricating process of a nanowire.

In addition, the present invention also relates to an optical sensor including an optical fiber and a nanowire connected to the optical fiber fabricated in accordance with the present invention.

The optical sensor according to the present invention may transmit light in the direction of the nanowire from the optical fiber, or receive light in the direction of the optical fiber from the nanowire. Or, it may transmit light in the direction of the nanowire from the optical fiber and then receive it again.

The nanowire connected to the optical fiber fabricated according to the present invention may have a coupling efficiency of 84% or more. The coupling efficiency is defined as a ratio between an optical power at the end of the nanowire and an optical power at the end of the optical fiber not including the nanowire.

Figure 6:
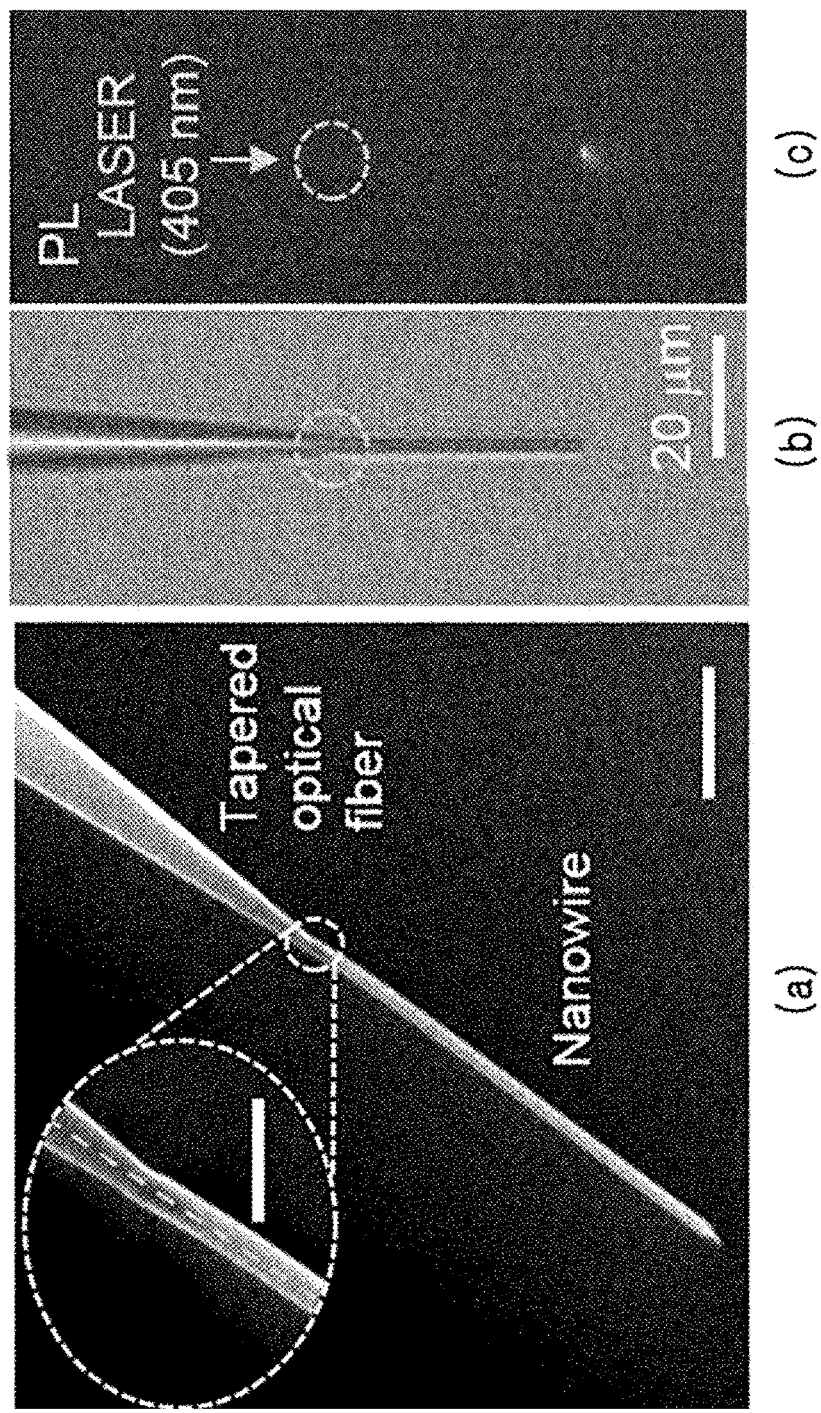
FIG. 6a shows FE-SEM image (size bar, 5 μm) of a waveguide probe having a nanowire of diameter 350 nm, and an inserted figure shows Fe-SEM image (size bar, 1 μm) of a connection portion of a nanowire coaxially aligned with a tapered optical fiber.
FIG. 6b shows an optical micrograph (OM) of a nanowire connected to an optical fiber.
FIG. 6c shows a photoluminescence (PL) micrograph of a nanowire connected to an optical fiber.

FIG. 6a shows FE-SEM image (size bar, 5 μm) of a waveguide probe having a nanowire of diameter 350 nm, and an inserted figure shows Fe-SEM image (size bar, 1 μm) of a connection portion of a nanowire coaxially aligned with a tapered optical fiber. FIG. 6b shows an optical micrograph (OM) of a nanowire connected to an optical fiber, and FIG. 6c shows a photoluminescence (PL) micrograph of a nanowire connected to an optical fiber. As can be seen in FIG. 6, due to the super-smooth junction between the nanowire and the tapered optical fiber, light scattering rarely occurs at the junction (yellow dashed circle) and exhibits high coupling efficiency at the junction (size bar, 20 μm). This is compared with the case where a certain amount of scattering phenomenon occurs when the nanowire is generally attached to the distal end of the tapered optical fiber.

Figure 7:
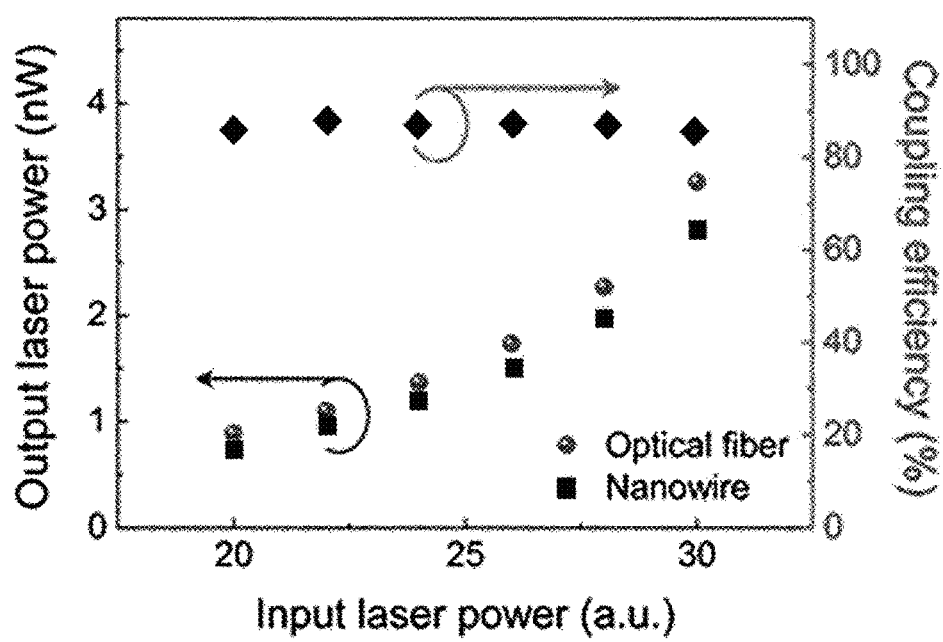
FIG. 7 shows coupling efficiency as a function of input laser power.

FIG. 7 shows a coupling efficiency as a function of the input laser power wherein the coupling efficiency a diamond mark) is defined as a ratio between a light power (a square mark) at the end of a nanowire according to the present invention and a light power (a point mark) at the end of an optical fiber not including the nanowire (an optical fiber having a tapered end portion). The optical coupling of the nanowire connected to the optical fiber fabricated according to the present invention has significantly improved to such an extent to have a coupling efficiency of 84% or more (FIG. 7, a diamond mark) with respect to the total power of the input laser tested in the present invention. Here, the coupling efficiency is determined by the ratio between the light power (a square mark in FIG. 7) at the end of the nanowire according to the present invention and the light power (a point mark in FIG. 7) at the end of the optical fiber not including the nanowire. A high coupling efficiency can significantly reduce an output laser power of the input laser at the end of the nanowire to about 1 nW to 3 nW, preferably to about 1 nW, which is sufficient to detect a photoluminescence (PL) of the nanowire.

What is claimed:

1. A method of fabricating a nanowire connected to an optical fiber comprises:
    a) filling a micropipette with a material solution to form a nanowire;
    b) coaxially aligning the micropipette with the optical fiber at one end of the optical fiber such that a longitudinal axis of the optical fiber and a longitudinal axis of the micropipette are aligned in a line;
    c) forming a meniscus of the material solution to form the nanowire in the coaxially aligned state; and
    d) fabricating the nanowire by evaporating a solvent from the material solution to form the nanowire while lifting the micropipette in a state in which the meniscus is formed, in a direction away from the optical fiber.

2. The method of fabricating the nanowire connected to the optical fiber according to claim 1, further comprising a step of controlling a shape of the distal end of the nanowire by irradiating a laser to the nanowire fabricated, after the step d).

3. The method of fabricating the nanowire connected to the optical fiber according to claim 1, wherein the optical fiber is of a tapered shape and has a diameter of 0.2 μm or less at its distal end.

4. The method of fabricating the nanowire connected to the optical fiber according to claim 1, wherein the diameter of the optical fiber end is smaller than that of the micropipette.

5. The method of fabricating the nanowire connected to the optical fiber according to claim 1, wherein the step of coaxially aligning the micropipette with the optical fiber at one end of the optical fiber such that the longitudinal axis of the optical fiber and the longitudinal axis of the micropipette are aligned in a line, is performed by using optical lenses positioned in the x- and y-axes.

6. The method of fabricating the nanowire connected to the optical fiber according to claim 1, wherein the nanowire connected to the optical fiber has a light-coupling efficiency of 84% or more.

7. An optical sensor comprising:
    an optical fiber; and
    a nanowire connected to the optical fiber, fabricated according to any one of claims 1 to 6.

8. The optical sensor according to claim 7, wherein the optical sensor receives light in a direction from the optical fiber to the nanowire.

9. The optical sensor according to claim 7, wherein the optical sensor receives light in a direction from the nanowire to the optical fiber.

10. The optical sensor according to claim 7, wherein the optical sensor transmits light in a direction from the optical fiber to the nanowire and receives light in an opposite direction to the direction.

* * * * *